United States Patent
Bonds

[15] 3,684,221
[45] Aug. 15, 1972

[54] HELICAL SUSPENSION CLAMP ASSEMBLY

[72] Inventor: Albert C. Bonds, Rocky River, Ohio
[73] Assignee: Helical Line Products Co., Rocky River, Ohio
[22] Filed: Oct. 23, 1970
[21] Appl. No.: 83,343

[52] U.S. Cl. ............................248/63, 174/DIG. 12
[51] Int. Cl. .................................................F16l 3/10
[58] Field of Search.....248/58, 61, 62, 63; 24/131 C, 24/123 C, 122.6; 174/DIG. 12; 57/145

[56] References Cited

UNITED STATES PATENTS

| | | | |
|---|---|---|---|
| 3,007,243 | 11/1961 | Peterson | 248/63 X |
| 2,081,974 | 6/1937 | Arnold | 248/63 X |
| 3,026,077 | 3/1962 | Peterson | 248/63 |
| 3,087,008 | 4/1963 | Ruhlman | 174/135 |
| 2,587,521 | 2/1952 | Peterson | 248/63 |
| 3,456,066 | 7/1969 | Petze | 248/61 X |

*Primary Examiner*—Chancellor E. Harris
*Attorney*—Yount & Tarolli

[57] ABSTRACT

An improved suspension clamp assembly for supporting a conductor or other line includes a body having a passage through which the line passes. The body is clamped in tight frictional engagement with the line by helical armor rods which are wrapped around the body and the line. The necessary clamping action between the body and the line is achieved by a partial lay of armor rods. The armor rods are positioned in a helical channel formed in the clamp body.

9 Claims, 6 Drawing Figures

INVENTOR
ALBERT C. BONDS
BY Young and Tarolli
ATTORNEYS

INVENTOR
ALBERT C. BONDS

BY Yount and Tarolli
ATTORNEYS

HELICAL SUSPENSION CLAMP ASSEMBLY

This invention relates to an apparatus for securing a line to an external support, and particularly relates to a suspension clamp assembly for use in connecting an electrical conductor or other line to a support.

There are a number of known structures in the form of suspension clamp assemblies for suspending power transmission lines and the like from towers or other supports. One commonly used design at the present time includes helical armor rods which encircle the conductor and provide a frictional engagement with the conductor. A multipart clamp arrangement is provided, in the known design, for securely clamping the armor rods down against the conductor. In such a construction, the armor rods are clamped by the multipart clamp arrangement against the conductor, and the outer ends of the armor rods encircle the conductor and apply a frictional clamp thereto. General constructions of this type are shown in U.S. Pat. No. 2,691,865 and No. 2,722,393.

Other assemblies for use in supporting or securing a conductor to a support include a so-called saddle which has at least two parts, one being a clamp body for receiving the conductor, the other a keeper. The keeper has two threaded U-bolt connections with the clamp body and by bolting the U-bolts over the keeper and through the clamp body, together provide a clamping engagement of the conductor therebetween.

These known suspension clamp arrangements, including the prior arrangements utilizing helical armor rods, are relatively expensive to fabricate and difficult to install. This is basically because of the fact that they involve a large number of parts and are constructed in a manner necessitating assembly in a cumbersome manner. For example, during the assembly of the aforementioned suspension clamp assembly utilizing armor rods, it is first necessary to place the armor rods in position on the conductor. Then it is necessary to place around the armor rods the clamp body parts. A clamp strap and a fastener are then utilized for drawing the clamp body parts together around the armor rods in order to clamp the armor rods against the conductor in a secure manner. In the saddle clamp arrangement, similar steps must be performed, since the saddle clamp is used with or without armor rods.

The present invention comprises a substantial improvement over the prior art due to the fact that it simplifies the structure of the suspension clamp assembly and greatly simplifies the assembly of the suspension clamp assembly in the field. In essence, the present invention provides a suspension clamp assembly wherein the helical armor rods press or clamp the line between themselves and the support body without the need for a keeper or clamp strap. Thus, the present construction eliminates the need for any keeper or clamping strap, which is common practice in the prior art. Of course, the elimination of such a keeper or clamping strap simplifies the installation in the field.

An additional advantage and a simplification of the present invention are that only a partial lay of armor rods is required as opposed to the more common full lay of armor rods. Additionally, the rods are positioned externally of the support body, thereby further simplifying the construction and assembly in the field.

The above advantages are provided by a construction embodying the present invention and which includes a group of helical armor rods extending through a helical channel in a support body and engaging a line which extends through the support body. The rods clamp the line against the body. The helical channel in the body has a pitch length such that adjacent turns of the group of armor rods are spaced apart and only a partial lay of armor rods is utilized. The armor rods solely clamp the conductor to the body, thereby eliminating the need for a keeper or clamp strap and also frictionally hold the conductor at the ends of the armor rods.

Accordingly, it is a principal object of the present invention to provide a new and improved suspension clamp assembly for securing a line to an external support and which assembly has few parts, is relatively inexpensive to manufacture, readily assembled in the field, and which is extremely effective in operation.

Another object of this invention is to provide a new and improved line suspension assembly having a support body through which the line extends and which is clamped against the line solely by helical armor rods carried by the support body.

Another object of this invention is to provide a new and improved suspension assembly for supporting a line and wherein the suspension assembly includes a body having a passage for receiving the line and a helical channel in which substantially helical armor rods are positioned.

Still another object of this invention is to provide a new and improved apparatus for securing a line to an external support including a body, a fastener for securing the body to the external support, and helical armor rods for frictionally gripping the line and wherein the helical armor rods comprise less than a full lay of armor rods.

Yet another object of this invention is to provide a new and improved apparatus, in accordance with the next preceding paragraph, and wherein the body and line are clamped together under the influence of only the helical armor rods.

Although the drawings show only a right-hand application of helical armor rods, the objects of the invention include both clockwise and counterclockwise applications.

Other objects and features of the invention will become more apparent upon a consideration of the following description taken in conjunction with the accompanying drawings wherein.

Figure 1:
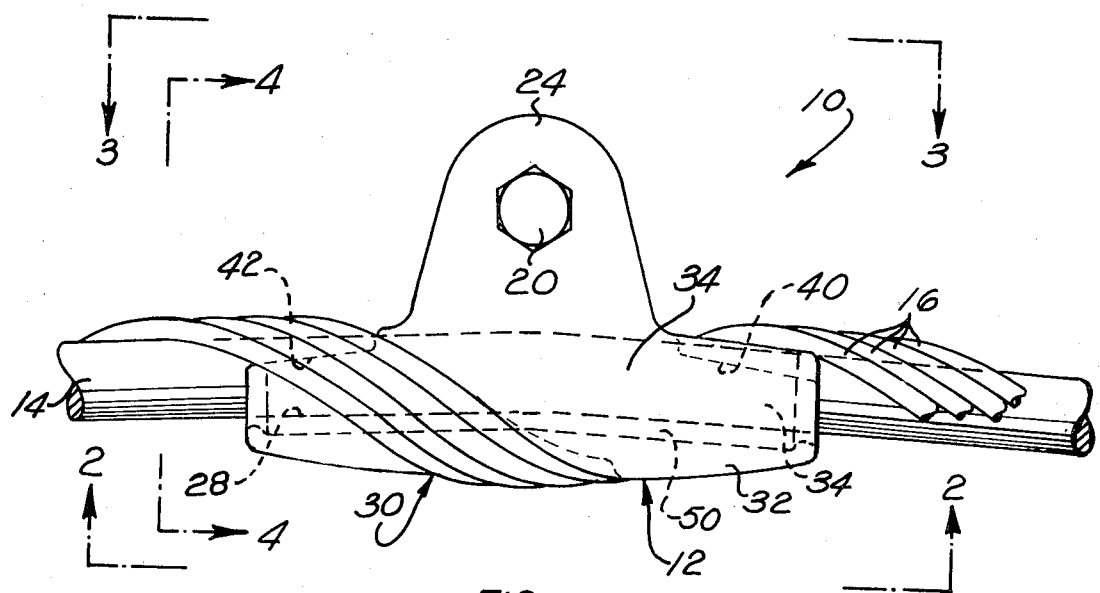
FIG. 1 is an elevational view of a suspension clamp assembly constructed in accordance with the present invention and including a body through which the conductor or other line extends and a plurality of helical armor rods.
Figure 4:
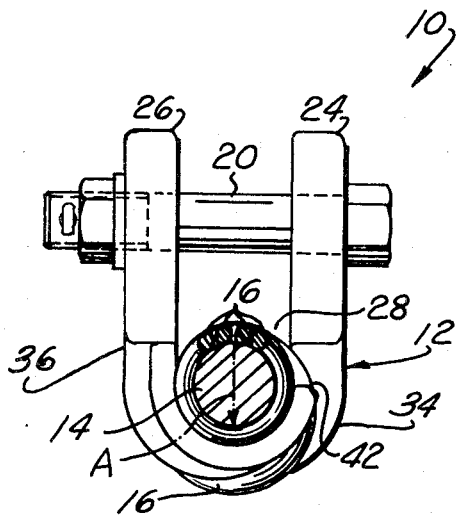
Figure 5:
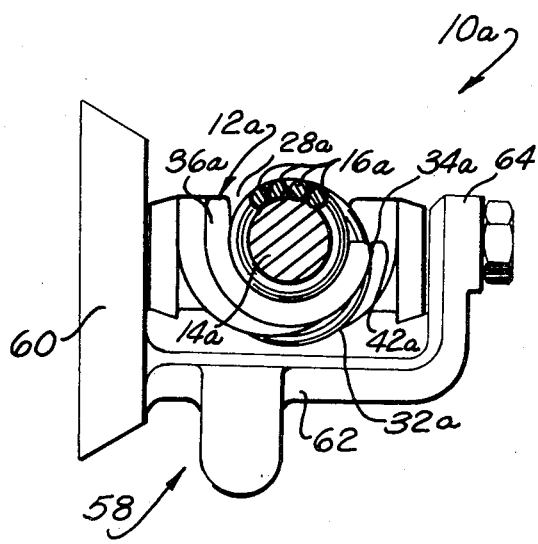
Figure 6:
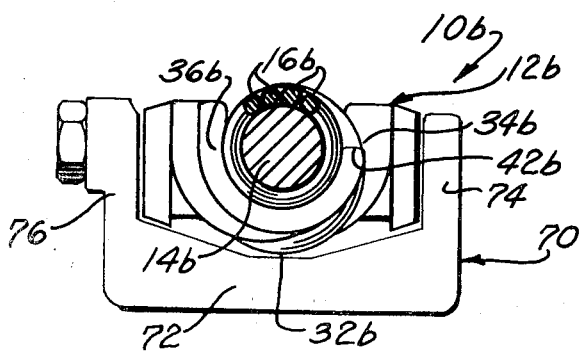

5 is an elevational view of another embodiment of the invention wherein a mounting bracket is associated with the body to support it for a vertical pin-type to press it against the body;

FIG. 4 is a sectional view, taken generally along the line 4—4 of FIG. 1, further illustrating the construction of the body and the relationship of the helical armor rods thereto;

FIG. 5 is an elevatonal view of another embodiment of the invention wherein a mounting racket is associated with the body to support it for a vertical pin-type installation; and FIG. 6 is a sectional view of another embodiment of the invention wherein a bracket is associated with the support body for use in a horizontal pin-type installation.

An improved line suspension clamp assembly 10, constructed in accordance with the present invention is illustrated in FIG. 1. The clamp assembly 10 includes a generally U-shaped body 12 which is pressed into clamping engagement with a conductor or line 14 by a plurality of helical armor rods 16. The helical armor rods 16 extend for a plurality of turns along the line 14 in opposite directions from the body 12. The armor rods 16 at their opposite outer ends encircle the line 14 and apply a relatively low-gripping pressure to a large surface area of the line 14 to frictionally grip the line and retain it against longitudinal movement relative to the body 12, as is well known. In order to provide this function, it is common to construct the armor rods so that the internal diameter thereof when assembled is slightly less than the external diameter of the conductor 14.

The body 12 is streamlined to minimize electrical corona stress raisers to thereby minimize radio interference and static noise. The streamlined body 12 is connected with a tower or support structure by a bolt 20 which is located midway between opposite ends of the body 12 and extends between a pair of upstanding flanges 24 and 26. Although the suspension clamp assembly 10 has been illustrated herein in connection with a line 14 for conducting electricity, it is contemplated that the suspension clamp assembly could be associated with other types of lines.

Figure 2:
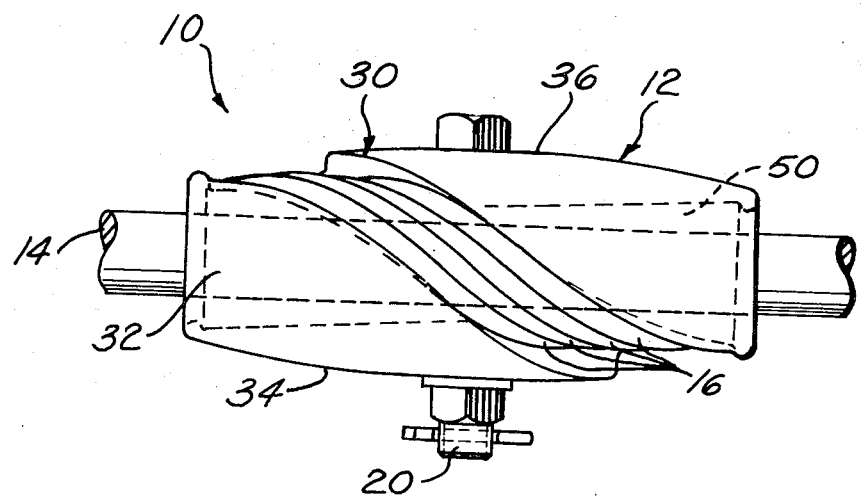
FIG. 2 is a plan view, taken generally along the line 2—2 of FIG. 1, illustrating the relationship between the helical armor rods and a helical channel formed in the body.
Figure 3:
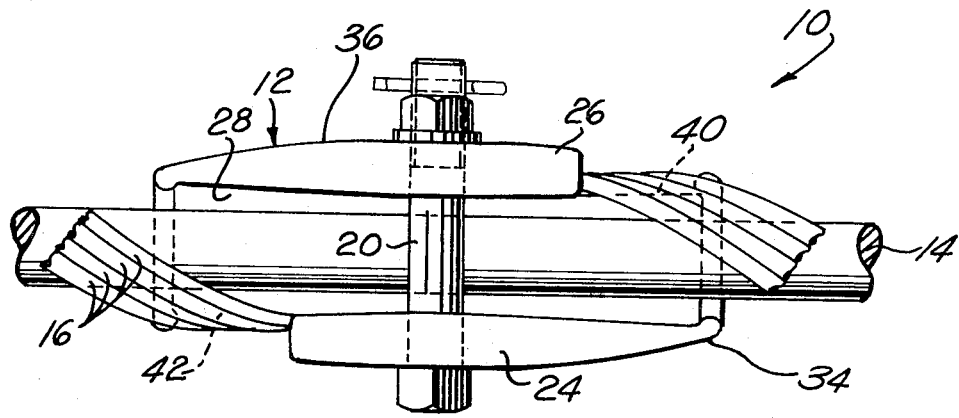

In accordance with a feature of the present invention, the armor rods 16 solely function to clamp the line 14 and the body 12 together, thereby eliminating the need for other mechanism, such as a keeper or clamp strap. The line 14 extends through a straight passage 28 (FIG. 4) formed by the generally U-shaped body 12. The armor rods 16 are positioned in a helical channel or groove 30 formed in the outer surface of the body (FIG. 2). The helical groove 30 has a longitudinal axis which is substantially parallel to the axis of the passage 28. The helical groove 30 extends along the bottom 32 of the body 12 and upwardly along the opposite side portions 34 and 36 of the body 12 (see FIG. 4). The helical groove 30 intersects the passage 28 so as to enable the armor rods 16 to engage the line 14 as the line leaves the body 12. The right end of the side portion 36 (as seen in FIG. 3) is open at 40 where the helical groove 30 intersects the passage 28, while the left end of the side portion 34 is open at 42 where the groove 30 intersects passage 28. The armor rods 16 are wrapped around the body 12 in the helical groove 30 and over the line 14 so that the armor rods press or clamp the line against the arcuate bottom section 32 of the body 12. In this manner, the body 12 and line 14 are clamped together under the influence of only the armor rods 16.

The ease of assembly of the present structure in the field should be apparent. First, the support body is positioned with the line 14 extending through passage 28, and the support body 12 is fastened to the external support by fastener 20. Then, the armor rods 16 are positioned in the groove 30 and entwined about the line 14. The armor rods may be readily assembled with the body 12 due to the fact that the helical groove 30 is on the outside of the body 12.

All the helical armor rods 16 are preformed with the same pitch length and internal diameter. The helical channel 30 and armor rods 16 are advantageously formed with substantially the same pitch length to enable the rods to be readily positioned in the helical channel. The internal diameter of the helical armor rods 16 is slightly less than the external diameter of the line 14 so that the armor rods apply a gripping pressure to the line 14 at the opposite ends of the armor rods. While this gripping pressure is relatively low, the armor rods 16 apply the pressure to the line 14 over a length which is sufficient to enable the rods to securely frictionally grip the line. Thus, the longitudinal axes of the helical armor rods 16 are coincident with the line 14 on opposite sides of the body 12.

Since the helical armor rods 16 have a diameter substantially less than the diameter of the helical groove 30, the helical armor rods 16 are resiliently deformed or tensioned by the body 12 when positioned in the groove 30. As a result, at the opposite ends of the body 12, the armor rods 16 apply substantial clamping pressure on the line 14 and body 12 together. The clamping pressure of the armor rods against the line preferably acts diagonally of the line and through the center of the line downwardly, as indicated by the dotted arrow A in FIG. 4.

In the event that the clamping force does not act substantially along the dotted arrow A of FIG. 4, but rather acts at an angle to the arrow A, which would result in urging the line 14 sidewardly relative to the body 12, the helical armor rods 16 may be bent in the area where they leave the body 12 and initially cross the line 14. This bend would be such that the helical armor rods cross the conductor 14 at an angle closer to 90° than is illustrated in FIG. 3. As a result of such a bending of the armor rods, the clamping pressure of the armor rods will act in a direction more closely approximating the direction indicated by the arrow A in FIG. 4.

It should be noted that as a result of the armor rods construction and their relationship to the body 12, the armor rods themselves clamp the line 14 to the body and such additional structure as a keeper or clamp strap, common in the art, is not required. Additionally, the armor rods engage the line at the opposite ends of the armor rods and provide a frictional clamp on the line, as is well known.

If desired, the sides 34, 36 of the body 12 could be extended axially so that a plurality of turns of the helical armor rods 16 would be wrapped around the body 12. However, in the illustrated embodiment of the invention, the armor rods 16 have an extent along the body 12 equal to substantially one pitch length of the armor rods. This results in the armor rods being wrapped around the line 14 at opposite ends of the body 12 to press the line firmly against the bottom portion 32 of the body 12. The body 12, of course, must have an axial length which is as great or greater than the axial extent of one-half of a turn of the helical armor rods 16 to enable the armor rods to perform any clamping of the body to the line 14.

It should be apparent from the drawings also that less than a full lay of armor rods 16 are utilized to hold the body 12 and the line 14 in clamping engagement with each other. Thus, the helical armor rods 16 are grouped together in the helical channel 30 and wrapped around the body 12 and the line 14 with adjacent turns of the group of helical armor rods being axially spaced apart so that the armor rods do not completely encase the associated line 14. This substantially reduces the cost of the suspension assembly and installation time as compared to a suspension utilizing a full lay of armor rods. However, it has been discovered that, even though a full lay of armor rods is not used, no detrimental loss of clamping pressure results, and the armor rods are fully capable of performing the above-described functions.

As illustrated in FIG. 1, the body 12 is provided on the inside of the passage 28 with a cushioning layer 50 on which the line 14 rests. While the cushioning layer 50 can be formed of many different substances and applied in different ways, the cushioning layer is advantageously made of neoprene molded onto the inside of the body 12 to cushion the clamping engagement between the body 12 and the line 14. However, it should be understood that the layer 50 of neoprene could be omitted, as shown in FIG. 4, and the line 14 pressed directly against the arcuate bottom surface of the passage 28. While the passage 28 has been shown in FIGS. 1–4 as being substantially straight and having a longitudinal axis which is coincident with the longitudinal axis of the line 14, it should be understood that in certain environments the passage through the body 12 could have an arcuate configuration so as to enable the suspension clamp assembly 10 to be located at a bend in the line.

In the embodiment of the invention shown in FIGS. 1–4, it is contemplated that the suspension assembly 10 will be connected with a suitable support member by positioning the support member between the upwardly projecting flanges 24 and 26 and extending the bolt 20 through a hole in the support member. However, in the embodiment of the invention shown in FIGS. 5 and 6, the suspension assembly is associated with mounting brackets which are connected with support structures. Since the embodiments of the invention illustrated in FIGS. 5 and 6 are, in many respects, similar to the embodiment of the invention illustrated in FIGS. 1–4, numerals similar to those utilized to designate components of the embodiment of the invention shown in FIGS. 1–4 have been utilized to designate components of the embodiments of the invention shown in FIGS. 5 and 6. To avoid confusion, the suffix letter $a$ is associated with the numerals designating components of FIG. 5 and the suffix letter $b$ is associated with the numerals designating the components of FIG. 6.

The suspension clamp assembly 10a of FIG. 5 includes a support body 12a which is clamped with the conductor or line 14a by a plurality of helical armor rods 16a. The helical armor rods 16a are entwined about the body 12a in a helical groove or channel formed in the bottom portion 32a extending upwardly along opposite side portions 34a and 36a of the body 12a. Only a partial lay of the armor rods 16a is provided to press the line 14a into tight frictional engagement with the bottom surface of a straight passage 28a extending through the body 12a.

The body 12a is mounted on bracket 58 having a base 60 which is adapted to be fixedly connected to a support member in a known manner. An arm 62 extends horizontally outwardly from the base 60 and has an upwardly extending end portion 64. The side portions 34a, 36a have clamping projections thereon and are clamped between the base 60 and portion 64. Thus, the body 12a is mounted between the base 60 and end portion 64 of the bracket 58 to support the conductor or line 14a.

In the embodiment of the invention illustrated in FIG. 6, a line or conductor 14b is disposed in a straight passage formed in a body 12b. The body 12b is held in tight clamping engagement with the conductor 14b by helical armor rods 16b which are wrapped around the body 12b in a helical channel which extends upwardly from a bottom portion 32b of the body 12b through opposite side portions 34b and 36b of the body. The helical armor rods 16b comprise less than a full lay of armor rods, that is, adjacent turns of the helical armor rods 16b are spaced apart.

The body 12b is mounted on a support member by a generally U-shaped bracket 70 having a base 72 and a pair of standing support arms 74 and 76. The side portion 34b of the body 12b is in clamping engagement with the support arm 74, while the side portion 36b of the body 12b is in clamping engagement with the arm 76 to thereby mount the body 12b between the arms 74 and 76. Although the suspension clamp assemblies 12a and 12b are adapted to be utilized, and are shown associated with what are known as vertical and horizontal pin-type installations, it should be understood that the suspension assemblies could be associated with many different kinds of mounting brackets for use in different types of installations.

In view of the foregoing description, it can be seen that the suspension clamp assembly 10 includes a body 12 which is pressed into firm frictional engagement with a longitudinally extending line or conductor 14 by a plurality of helical armor rods 16. The armor rods 16 extend for several turns along the line 14 in opposite directions from the clamp body 12 to securely grip the line 14. The body 12 and line 14 are clamped firmly together by only the armor rods 16. Thus, the body 12 and armor rods 16 cooperate with the line 14 to prevent relative movement between the line and the body 12.

The installation of the clamp assembly 10 is facilitated by the fact that the body 12 is pressed against the line 14 by only the armor rods 16 so that it is unnecessary to provide a separate clamp to press the body 12 into gripping engagement with the line 14. This tends to minimize the number of components and tools required to install the suspension clamp assembly. By utilizing less than a full lay of armor rods 16, the material cost and installation time for a given suspension clamp assembly 10 is reduced.

Having described specific preferred embodiments of the invention, the following is claimed:

1. Apparatus for securing a line to an external support comprising a body having a passage extending therethrough for receiving the line, means in said body defining a substantially helical channel therein, the axis of the helical channel extending along the passage for receiving the line, said body having portions thereof for attachment to the external support, and substantially helical armor rod means positioned in said helical channel and entwined about the line and clamping the line to said body, said helical armor rod means including a plurality of armor rods disposed in a group in said helical channel, said helical channel having a pitch length such that adjacent turns of the group of armor rods are axially spaced apart.

2. Apparatus for securing a line to an external support comprising a body having a passage extending therethrough for receiving the line, means in said body defining a substantially helical channel therein, said means defining said helical channel comprising spaced generally parallel channel side surfaces extending from the outer surface of the body inwardly thereinto and a channel bottom surface interconnecting said channel side surfaces, the axis of the helical channel extending along the passage for receiving the line, said body having portions thereof for attachment to the external support, a plurality of substantially helical armor rods positioned in said helical channel and entwined about the line and gripping said line, and said helical arm rods applying a generally radially acting clamping force to said line clamping said line to said body, said plurality of helical armor rods forming a helical formation having an inside diameter at the outer ends thereof which is slightly smaller than the outside diameter of the line which is gripped thereby, and said resilient helical rods extending in both directions from said body a sufficient distance to grip the line to prevent longitudinal movement of the line relative to said body.

3. Apparatus as set forth in claim 19 wherein the length of the body is at least one-half of a pitch length of said helical armor rod means.

4. Apparatus as set forth in claim 2 wherein the surface shape of said body is streamlined to minimize electric corona stress.

5. Apparatus for securing a line to an external support comprising a body having an essentially straight passage extending therethrough for receiving the line, said passage being defined by a passage surface portion of said body, said body having portions thereof for attachment to the external support, fastening means cooperable with said portions for securing said body to said external support, substantially helical armor rod means comprising a plurality of armor rods having a straight helical axis, said helical armor rods being wrapped at least part way around said body, and said body having a body portion which is open so that said armor rods engage said line through the open body portion and apply a radial clamping force thereto clamping said line to said surface portion of said body.

6. Apparatus as set forth in claim 5 wherein said body includes means defining a helical channel in which said helical armor rods are disposed with the longitudinal axis of said helical armor rods extending parallel to the longitudinal axis of said helical channel, and said helical channel having a pitch length such that adjacent turns of the helical armor rods are axially spaced apart.

7. Apparatus as set forth in claim 6 wherein said helical armor rods comprise less than a full lay.

8. Apparatus for securing a line to an external support and which is adapted to cooperate with a plurality of helical armor rods which are to be entwined about the line, said apparatus comprising a body having an essentially straight passage extending therethrough for receiving the line, said passage at least in part being defined by a passage surface portion of said body, means in said body defining a substantially helical channel for receiving the plurality of helical armor rods, said helical channel being formed in an outer surface of said body and opening outwardly to enable said helical armor rod means to be located therein, said means defining said helical channel comprising spaced generally parallel channel side surfaces extending from the outer surface of the body inwardly thereinto and a channel bottom surface interconnecting said channel side surfaces, the axis of the helical channel extending along the passage for receiving the line, and said body having portions thereof for attachment to the external support.

9. Apparatus as defined in claim 8 wherein said body has a portion which is open so that armor rods in said channel may engage the line through the open body portion and clamp the line to said passage surface portion.

* * * * *